United States Patent [19]

Nesheiwat et al.

[11] Patent Number: 5,089,597
[45] Date of Patent: Feb. 18, 1992

[54] METHOD TO RECOVER GRANULAR POLY(ARYLENE SULFIDE KETONE) AND POLY(ARYLENE SULFIDE DIKETONE)

[75] Inventors: Afif M. Nesheiwat, Madison, N.J.; John E. Geibel, Bartlesville, Okla.

[73] Assignee: Phillips Petroleum Company, Bartlesville, Okla.

[21] Appl. No.: 458,919

[22] Filed: Dec. 29, 1989

Related U.S. Application Data

[63] Continuation-in-part of Ser. No. 187,756, Apr. 28, 1988, abandoned.

[51] Int. Cl.$^5$ ............................................. C08G 2/00
[52] U.S. Cl. .................................. 528/226; 525/471; 525/537; 528/388; 528/224; 528/481; 528/494; 528/495; 528/498; 528/499
[58] Field of Search ............... 525/471, 537; 528/224, 528/226, 481, 494, 495, 498, 499, 388

[56] References Cited

U.S. PATENT DOCUMENTS

| | | | |
|---|---|---|---|
| 4,232,142 | 11/1980 | Barr et al. ......................... | 528/125 |
| 4,361,693 | 11/1982 | Jansons ............................. | 528/86 |
| 4,415,729 | 11/1983 | Scoggins et al. .................. | 528/388 |
| 4,490,522 | 12/1984 | Kawabata et al. ................. | 528/388 |
| 4,645,826 | 2/1987 | Iizuka et al. ....................... | 525/537 |
| 4,699,975 | 10/1987 | Katto et al. ........................ | 525/537 |
| 4,716,212 | 12/1987 | Gaughan ........................... | 528/226 |
| 4,730,034 | 3/1988 | Nesheiwat et al. ................ | 528/388 |
| 4,748,231 | 5/1988 | Nesheiwat ......................... | 528/486 |
| 4,801,664 | 1/1989 | Nesheiwat et al. ................ | 525/537 |
| 4,841,022 | 6/1989 | Nakamura et al. ................ | 528/494 |
| 4,877,850 | 10/1989 | Geibel et al. ....................... | 525/537 |
| 4,889,893 | 12/1989 | Kobayashi et al. ................ | 525/537 |
| 4,963,651 | 10/1990 | Nesheiwat ......................... | 528/499 |
| 5,003,042 | 3/1991 | Nesheiwat ......................... | 528/388 |

FOREIGN PATENT DOCUMENTS 0156131 10/1985 European Pat. Off. .

Primary Examiner—Melvyn I. Marquis
Attorney, Agent, or Firm—Beverly M. Dollar

[57] ABSTRACT

The invention is a process to provide more granular, higher bulk density particulate poly(arylene sulfide ketone) or poly(arylene sulfide diketone) resins having associated therewith improved handling.

The process for treating a first slurry comprising a solid particulate poly(arylene sulfide ketone) or poly(arylene sulfide diketone) resin dispersed in a liquid medium comprising a polar organic compound, comprises: (a) liquifying the first solid particulate resin in the first slurry to form a first mixture comprising a liquified resin and the polar organic compound; (b) adding, to the first mixture, a sufficient amount of at least one separaton agent to produce a second mixture, and (c) reducing the temperature of the second mixture sufficiently to solidify the liquified resin to form a second slurry comprising a polar organic compound and a second solid particulate resin having a bulk density greater than the first solid particulate resin would if recovered.

In other embodiments, the above-described process is accomplished without generating pressure significantly greater than those generated during polymerization reactions of particulate poly(arylene sulfide ketone) or poly(arylene sulfide diketone) resins.

26 Claims, No Drawings

METHOD TO RECOVER GRANULAR POLY(ARYLENE SULFIDE KETONE) AND POLY(ARYLENE SULFIDE DIKETONE)

CROSS-REFERENCE TO RELATED APPLICATION

This application is a continuation-in-part of prior application, Ser. No. 187,756, filed Apr. 28, 1988, now abandoned.

FIELD OF THE INVENTION

This invention relates to processes for treating polymers of aromatic compounds. In one aspect, this invention relates to processes for the production and recovery of poly(arylene sulfide ketone)s or poly(arylene sulfide diketone)s.

BACKGROUND OF THE INVENTION

Poly(arylene sulfide ketone) (henceforth PASK) resins and poly(arylene sulfide diketone) (henceforth PASDK) resins are engineering thermoplastics of potential commercial interest for film, fiber, molding, and/or composite applications because of their outstanding thermal and mechanical properties. General processes for the production of poly(arylene sulfide ketone)s and poly(arylene sulfide diketone)s are known in the art. For example, poly(arylene sulfide ketone)s or poly(arylene sulfide diketone)s can be prepared by the reaction of an alkali metal sulfide in a polar organic compound with a polyhaloaromatic ketone or a polyhaloaromatic diketone, respectively.

A major disadvantage often associated with the production of poly(arylene sulfide ketone)s and poly (arylene sulfide diketone)s pertains to the particle size of the polymeric particles produced. Generally, at the completion of the polymerization reaction, the reaction mixture is a slurry comprising a liquid phase (predominantly a polar organic compound and water) with a solid phase dispersed therein (predominantly polymeric resin). This slurry filters very slowly and, thus, hampers the polymer's washing, recovery, and handling processes. When the polymer is recovered by usual methods, it is ordinarily in the form of powder-like particles having very low bulk densities (e.g. generally less than 10 lbs/ft$^3$). Recovery, processing and handling of PASK and PASDK resins which have low bulk densities and are in a powder-like form are extremely difficult.

Extreme difficulty in feeding an extruder with this low bulk density powder-like resin has also been experienced. Efforts to force feed an extruder with an auger-fed hopper does not overcome these difficulties, nor does compacting the powder, such as in a heated 2-roll mill. Furthermore, the fine particle size introduces a non-systematic error in the determination of the melt flow of the polymeric resins. Variations in the time required to load the barrel of the melt flow apparatus with low bulk density powder produces an uncertainty in the test results since PASK and PASDK require high temperatures for melt viscosity determinations; and those high temperatures may compromise melt stability of the polymers under the measurement conditions.

Other problems which are inherent with low bulk density resins pertain to commercial plant operations, such as production and storage capacities and/or environmental concerns. Specifically, since production and storage vessels in a commercial plant have a constant volume associated therewith, as the bulk density of a polymeric resin decreases, so does the production and storage capacity of the commercial plant. Therefore, if the bulk density of a polymeric resin can be increased, the production and storage capacities of the commercial plant would also increase.

As for environmental concerns, a low bulk density resin which is in a form of a powder would have a greater tendency of being dispersed through the air of the working environment during downstream processing and handling procedures than would a similar polymeric resin having a higher bulk density. Therefore, providing a polymeric resin having an increased bulk density would improve the environmental conditions which are associated with the handling and processing of such a resin.

Treating powder-like PASK and PASDK resins in a manner which produces granular resin particles having bulk densities greater than their untreated counterparts would greatly improve the recovery and processability of these resins. Therefore, one object of this invention is to provide a method for treating PASK and PASDK resins in a manner which produces granular particles having bulk densities greater than their untreated counterparts, wherein the handling, filterability and processability of the respective polymeric resins are improved.

The internal pressures in polymerization process vessels during typical polymerization reactions are generally high (e.g., above about 100 psig). Safety risks and economic concerns are often associated with excessively high polymerization reactor pressures. For instance as the internal pressure of a polymerization process vessel increases, the risk of potential safety hazards increases, as does the cost of designing and/or fabricating this process vessel.

When designing, purchasing and/or fabricating polymerization process vessels, one does so with the understanding that the polymerization process for which it will be employed will generate pressures falling within a specific range. Therefore, although a process to provide higher bulk density PASK or PASDK resins which have associated therewith improved processability is desirable, the desirability of such a process may decrease if it results in generating pressures within a polymerization process vessel which were in excess of the vessel's operable range.

It is yet a further object of this invention to provide more granular, higher bulk density particulate PASK or PASDK resins having associated therewith improved processability without generating pressures significantly greater than those generated during polymerization reactions of PASK or PASDK resins.

Other aspects, concepts, and objects of this invention will become apparent from the following detailed description and the appended claims.

STATEMENT OF THE INVENTION

This novel invention discloses a process to produce a more granular particulate PASK and PASDK of increased bulk densities. In another embodiment of this invention, the pressures generated by this inventive process are not significantly greater than those generated during the polymerization process of the respective first particulate resin.

In accordance with this invention, a process is provided for treating a first particulate poly(arylene sulfide ketone) resin or a first particulate poly(arylene sulfide diketone) resin, present in a first slurry, wherein the liquid medium of the first slurry comprises a polar organic compound, to produce a second particulate poly(arylene sulfide ketone) resin or a second particulate poly(arylene sulfide diketone) resin, such that the second particulate resin produced has a bulk density greater than that of its respective first resin would if recovered, which process comprises: (a) substantially liquifying the first particulate resin in the first slurry to form a first liquid mixture comprising the substantially liquified resin and the polar organic compound; (b) adding to the first liquid mixture an effective amount of at least one liquid separation agent to produce a second liquid mixture; and (c) reducing the temperature of the second liquid mixture sufficiently to solidify the substantially liquified resin and form a second slurry comprising a polar organic compound and a second particulate resin, wherein the second particulate resin has a bulk density greater than that of the first particulate resin would if recovered.

The bulk density of the recovered second particulate resin is greater than that of its respective first particulate resin when recovered. The processability and filterability of the second particulate resin slurry are superior to those of its respective first particulate resin slurry. In certain embodiments of this invention the pressures generated by practicing the method of this invention are not significantly greater than those generated during the polymerization process of the respective first particulate resin.

DETAILED DESCRIPTION OF THE INVENTION

As used herein, the term "bulk density" refers to the density of a granular or powderlike polymeric resin as determined by completely filling a container, having a known weight and volume, to its brim with the polymer sample to be tested. The bulk density of the specific polymer is then calculated after measuring the weight of the polymer in pounds (lbs) as a function of the volume of the container in cubic feet (ft$^3$). For the purposes of this invention, PASK resins or PASDK resins having bulk densities of at least 10 lbs/ft$^3$ are deemed to overcome handling, filterability, and/or processing problems often associated with the powder-like resins which have bulk densities less than about 10 lbs/ft$^3$.

Bulk density of dried granular or powderlike polymeric resins can be determined in terms of "loose" bulk density and/or "compacted" bulk density. The loose bulk density of a polymeric resin is determined by measuring the weight of the polymer as it naturally fills the test container to its brim. On the other hand, the compacted bulk density of a polymeric resin is determined by physically compacting the polymer in the test container, until the compacted polymer reaches the brim thereof, prior to weighting the amount of polymer contained therein. The term "bulk density" used herein refers to the resin's loose bulk density.

The polymers which can be treated by the process of this invention are those having the repeating unit:

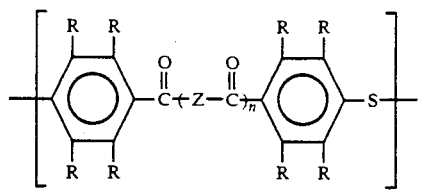

where n=0 or 1, Z=divalent radical selected from

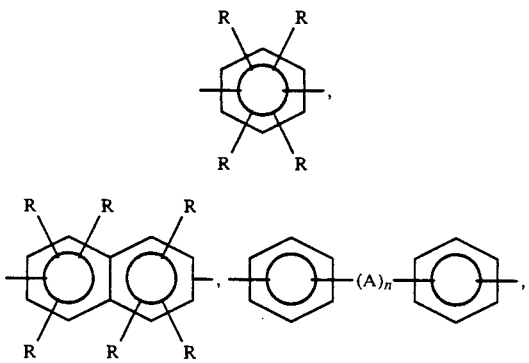

where m=0 or 1, A selected from O, S,

$SO_2$, $CR_2$, R=H or an alkyl radical having 1-4 carbon atoms.

Although other polymeric resins are not excluded, the presently preferred PASK resins and the PASDK resins recovered by this invention are poly(phenylene sulfide ketone) resins having the repeating unit:

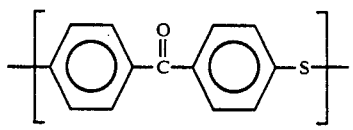

and poly(phenylene sulfide diketone) resins having the repeating unit:

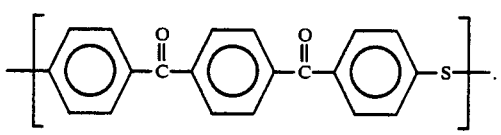

This invention provides processes for increasing both the particle size and the bulk density of either a first PASK resin or a first PASDK resin. Generally, the inventive process comprises: (a) substantially liquifying the first particulate resin present in a first slurry, wherein the liquid component of the first slurry comprises a polar organic compound, to form a first liquid mixture comprising the substantially liquified resin and the polar organic compound; (b) adding, to the first liquid mixture, at least one liquid separation agent, to produce a second liquid mixture, wherein the amount of liquid separation agent added is at least that sufficient to result in a separation of said resin in a polymer rich phase and said polar organic compound, and (c) reducing the temperature of the second liquid mixture sufficiently to permit the substantially liquified resin to solidify and form a second slurry comprising a polar organic compound and a second particulate resin, wherein the second particulate resin has a bulk density greater than the first particulate resin would if recovered. Thereafter, the second particulate resin can be recovered from the second slurry.

This invention is effective for increasing the bulk density of any PASK or PASDK resin. The resins can have their bulk densities increased in accordance with the embodiments of this invention at any time after the resins are prepared, as long as a first slurry can be prepared wherein the solid component comprises at least a particulate PASK or PASDK resin and the liquid component comprises at least a polar organic compound. One example of a process which results in a first slurry is taking a PASK or PASDK resin which has already been prepared, recovered and optionally dried, and adding this resin to a liquid comprising a polar organic compound and optionally water.

Another example of a process that will produce such a first slurry is one wherein a dihalo-substituted aromatic ketone or diketone is reacted with (1) either (a) a base (e.g., NaOH) and a sulfur-containing source (e.g., NaHS) or (b) an alkali metal sulfide (e.g., Na$_2$S), (2) a polar organic compound (e.g., N-methyl-2-pyrrolidone), and optionally (3) water, under polymerization conditions.

The substantial liquification of the first particulate PASK resin or the first particulate PASDK resin contained within the first slurry can be accomplished by using any suitable liquification process known by those skilled in the art. One example of such a suitable method includes, but is not limited to, heating the first slurry to a temperature at which the first particulate resin liquified. It is noted, however, that since the first slurry often comprises an amount of a polar organic compound which also functions as a solvent for the particulate resins, depending upon the type and/or amount of the polar organic compound present in the first slurry, the elevated temperature of the resin liquification step need not necessarily achieve or exceed the melting point of the resin. For example, if the solid component of the first slurry comprises a specific particulate PASK resin such as poly(phenylene sulfide ketone) (PPSK), and the liquid component of the same slurry consists solely of a specific polar organic compound reaction component which can also function as a solvent for PPSK such as N-methyl-2-pyrrolidone (NMP), in order to substantially liquify the specific resin the first slurry need only be heated to a temperature of at least about 280° C. (536° F.) even though the melting point of PPSK is ordinarily above about 340° C. As another example, if the solid component of a first slurry comprises a specific particulate PASDK resin such as poly(phenylene sulfide diketone) (PPSDK) and, as the liquid component, a polar organic compound which also functions as a solvent such as NMP, in order to liquify the specific particulate resin, this first slurry need only be heated to a temperature of at least about 323° C. (613° F.).

Another example of a suitable liquification process is the addition of a suitable compound to the first slurry which can function as a solvent for the resin. Depending upon the type and/or amount of this compound being subsequently added to the first slurry, it may still be necessary to elevate the temperature of the first slurry in order to substantially liquify the particulate resin contained therein. Moreover, if other components are included in the first slurry, the temperature required to substantially liquify the PASK or PASDK polymer will generally increase. For example, if the solid component of a first slurry comprises PPSK as the PASK resin and the liquid component of the same slurry consists essentially of NMP and a small amount of water (e.g., approximately 10% by weight of liquid component), in order to substantially liquify the specific particulate resin, this first slurry must be heated to a temperature of at least about 300° C. (572° F.). As another example, if the solid component of the first slurry comprises PPSDK as the PASDK resin and the liquid component of this same slurry consists essentially of NMP and a small amount of water (e.g., approximately 10% by weight of liquid component), in order to liquify the particulate resin, this first slurry must be heated to a temperature of at least about 343° C. (650° F.). Since in typical PASK or PASDK polymerization reactions the liquid component of the first slurry does not consist solely of a polar organic compound, the presently preferred method of substantially liquifying PASK or PASDK resins after a completed polymerization reaction is to heat the first slurry to a temperature of at least about 300° C. (572° F.), more preferably in the range from about 300° C. (572° F.) to about 325° C. (617° F.).

Another method of liquifying a first particulate PASK or PASDK resin contained in a first slurry resulting from a completed polymerization reaction comprises venting vapors from the enclosed reaction vessel containing the heated first slurry such that some or essentially all of the water is removed therefrom. In order to practice this technique, the temperature of the first slurry must be above about 100° C. (212° F.) preferably above about 200° C. (392° F.). After the reaction vessel has been vented, the liquid component of this vented first slurry will consist essentially of the polar organic compound and any water which was not removed by the venting step.

The liquid separation agents suitable for use in this invention can be any which have the following characteristics: (a) soluble in the polar organic compound present in the first slurry; (b) a non-solvent for the particulate resin; and (c) able to effectuate a separation in the liquid mixture between the substantially liquified polymer and the remaining liquid components of the liquid mixture. Examples of suitable liquid separation agents include, but are not limited to, water; paraffinic hydrocarbons such as heptane, octane and nonane; higher boiling alcohols such as hexanol; higher boiling ethers, such as tetraethylene glycol dimethylether and tetraethylene glycol diphenylether; and the like, and mixtures thereof. Due to its effectiveness and commercial availability, water is the presently preferred agent.

As stated earlier, the PASK and PASDK polymerization reactions often result in a first slurry, wherein due to the polymerization recipe, an initial amount of an agent (water) is already present which can be used for separation purposes. Depending upon the specific polymerization process, the amount of suitable separation agent (water) present in the first slurry at the completion of the polymerization reaction can range from an undetectable amount up to an amount which is sufficient to effect separation in a liquid reaction mixture between the substantially liquified polymer in a polymer rich phase and the polar organic compound. Generally, during a polymerization process for the preparation of PASK or PASDK, wherein the sulfur source is provided by employing a mixture of a base (e.g., NaOH) and sodium hydrosulfide (NaHS), approximately one mole of water is produced for each mole of divalent sulfur present in the repeating units of the respective resins.

In the first slurry, the molar ratio of the moles of polar organic compound per mole of divalent sulfur present in the resin is usually determined by mechanical and/or economic limitations. When the first slurry is that resulting from a polymerization reaction, the molar ratio of the polar organic compound to the divalent sulfur present in the resin generally ranges from about 3:1 to about 25:1; preferably from about 6:1 to about 20:1, and more preferably from about 8:1 to about 16:1.

To increase both the particle size and the bulk density of either a PASK resin or a PASDK resin in accordance with this invention, the molar ratio of the molar sun of (1) any liquid separation agent present in the first slurry at the completion of the polymerization reaction and (2) the liquid separation agent or agents subsequently added to the first slurry; to the moles of polar organic compound dispersed in the particulate resin present in the first slurry should be such that the recovered resin has a bulk density when recovered greater than 10 lbs./ft$^3$. The upper limit on the amount of separation agent used will be governed by practical and/or economic limitations. When water is employed as the separation agent, as has been noted, the use of greater amounts leads to increased system pressures. It is presently preferred to use a molar ratio of separation agent to polar organic compound within the range of 1:1 to 3:1.

Alternatively, the amount of separation agent employed can be related to the amount of divalent sulfur present in the poly(arylene sulfide ketone) or poly(arylene sulfide diketone). As an example, to increase both the particle size and the bulk density of either a PPSK resin or a PPSDK resin in accordance with this invention, when the polar organic compound is NMP and the separation agent is water, it is preferred that, the molar ratio of the molar sum of (1) any separation agent present in the first slurry at the completion of the polymerization reaction and (2) the liquid separation agent subsequently added to the liquid mixture, to that of the moles of divalent sulfur present in the particulate resin present in the first slurry, be at least about 7:1. Preferably, the molar ratio will range from about 7:1 to about 28:1, more preferably from about 11:1 to about 26:1, and even more preferably from about 14:1 to about 24:1.

PASK or PASDK resins generally have a polymerization reaction temperatures ranging from about 232° C. (450° F.) to about 288° C. (550° F.). At the completion of typical PASK or PASDK polymerization reactions, a heated first slurry is generally formed in an enclosed reaction vessel. This heated first slurry comprises a solid particulate PASK or PASDK resin dispersed in a liquid mixture consisting predominantly of a polar organic compound and water. At the termination of the polymerization reaction, the pressure within this enclosed reaction vessel will generally range from about 150 psig to about 500 psig.

Polar organic compounds which can be employed when practicing this invention are those which remain substantially in a liquid-phase at the temperatures and pressures used for substantially liquifying the first solid particulate resin, and which can also function as a solvent of the first solid particulate resin. Generally, an organic amide is employed as the polar organic compound. Suitable organic amides can be cyclic or acyclic and can have from about 1 to about 10 carbon atoms per molecule. Examples of suitable organic amides include, but are not limited to, formamide, acetamide, N-methylformamide, N,N-dimethylformamide, N,N-dimethylacetamide, N-ethylpropionamide, N,N-dipropylbutyramide, 1-pyrrolidone, N-methyl-2-pyrrolidone (NMP), N,N'-ethylenedi-2-pyrrolidone, hexamethylphosphoramide, tetramethylurea, and mixtures thereof. NMP is the presently preferred organic amide. The amount of polar organic compound employed in this invention varies depending on the compound used and the polymer to be prepared. For example, if PPSK is being prepared in the first slurry, the molar ratio of the polar organic compound (NMP to the divalent sulfur present in the resin ranges from about 3:1 to about 25:1; preferably from about 6:1 to about 20:1, and more preferably from about 18:1 to about 16:1.

The moles of divalent sulfur present in the resin can be readily determined by one skilled in the art. If the first slurry which contains the first particulate resin is the slurry which results at the completion of a typical polymerization reaction, the moles of divalent sulfur present in the resin is approximately equal to the moles of sulfur charged to the polymerization vessel.

When practicing this invention, the internal pressure within the polymerization reaction vessel will increase if the temperature within the treating vessel is sufficient to vaporize a portion of the liquid separation agent subsequently added. In other words, since water has an appreciable vapor pressure at temperatures required to liquify the first solid particulate resin, if water is employed as the separation agent the pressure within the treating vessel will increase. In some applications, however, it is desirable to operate a polymerization reactor at lower temperatures and pressures. Therefore, other embodiments of this invention provide processes for increasing the bulk density of the first particulate polymeric resin at lower temperatures and pressures.

One method of increasing the bulk density of the resin without generating higher pressures and temperatures than those experienced in a typical polymerization is to select a separation agent having a lower vapor pressure at the temperatures employed to substantially liquify the PADK or PASDK resin. For example, tetraethylene glycol dimethylether can advantageously be employed as the separation agent according to this invention without generating a high pressure as would the use of water as a separation agent.

If it is desired, vapors can be vented from the enclosed reaction vessel containing the heated first slurry resulting from a terminated polymerization reaction, such that at least a portion of the water is removed therefrom prior to the substantial liquification of the resin. Employment of a venting step prior to the substantial liquification of the resin prevents the pressure from exceeding the pressure produced during the polymerization reaction. In order to practice this technique, the temperature of the first slurry must be above about 100° C. (392° F.). For purposes of this invention, "terminated polymerization reaction" means that the polymerization has been effectively terminated. The term is not meant to imply that the reaction is necessarily complete, nor that 100% conversion of monomer to polymer has occurred.

Another method according to these latter embodiments provides a process for treating a first particulate PASK resin or a first particulate PASDK resin present in a first slurry, wherein the liquid medium of the first slurry comprises a polar organic compound, to produce a second particulate PASK resin or a second particulate PASDK resin, such that the second resin produced has a bulk density greater than its respective first resin would if recovered, which process comprises: (a) substantially liquifying the first particulate resin in the first slurry to form a first liquid mixture comprising the substantially liquified resin and the polar organic compound; (b) reducing the temperature of the first liquid mixture to a temperature not less than 20° C. above the normal liquid-to-solid phase transitional temperature of the substantially liquified resin contained therein; (c) adding to the first liquid mixture an effective amount of at least one liquid separation agent to produce a second liquid mixture; (d) reducing the temperature of the second liquid mixture sufficiently to solidify the substantially liquified resin and form a second slurry comprising a polar organic compound and a second particulate resin, wherein the second resin has a bulk density greater than the first particulate resin would if recovered; and (e) recovering the second particulate resin from the second slurry.

In the above-described embodiment, when the liquid separation agent is added to the liquid reaction mixture after the temperature of the liquid reaction mixture has been lowered to a temperature not less than 20° C. above the normal liquid-to-solid phase transitional temperature of the substantially liquified resin, the internal pressure of the reactor vessel does not increase to the degree observed when the liquid separation agent is added at a temperature at or above that which is necessary to substantially liquify the specific resin under a given set of conditions. For example, if water is employed as the separation agent of this latter embodiment, the reactor pressure will still increase; however, it will not increase to the extent observed if water was employed as the separation agent of the embodiment which does not include the step which cools the first liquid mixture prior to adding the liquid separation agent thereto.

The phrase normal "liquid-to-solid phase transitional temperature", as used herein, refers to the temperature at which the liquid reaction mixture must be lowered in order for the substantially liquified resin to solidify. This liquid-to-solid phase transitional temperature differs somewhat with the type of resin produced and is readily determined by one skilled in the art. For example, by using a high pressure, flat glass gage that can be heated, such as that available from the Jerguson Gage & Valve Co., it can be seen that PPSK has a transitional temperature in the range above about 245°–(473° F.). Therefore, to increase the bulk density of a particulate PPSK resin in accordance with the latter embodiment of this invention, after the resin has been substantially liquified, the temperature of the liquid mixture comprising the substantially liquified resin and the polar organic compound is lowered from the liquification temperature to a temperature at or above about 265° C. (509° F.).

On the other hand, PASDK resins have a liquid-to-solid phase transitional temperatures which are generally greater than those for PASK resins. For example, poly(phenylene sulfide diketone) has a liquid-to-solid phase transitional temperature above about 302° C. (575° F.). Therefore, to increase the bulk density of a particulate poly(phenylene sulfide diketone) resin in accordance with the latter embodiment of this invention, after the resin has been liquified, and before adding the liquid separation agent, the temperature of the liquid mixture is lowered from the resin liquification temperature to a temperature at or above about 322° C. (612° F.).

Thus, after the particulate resin has been liquified and the appropriate amount of the selected liquid separation agent or agents have been added to the liquid mixture, the temperature of the liquid mixture is lowered to a temperature at or below the specific resin's liquid-to-solid phase transitional temperature. As stated earlier, this transitional temperature differs with the type of polymer produced and is readily determined by one skilled in the art.

The thermal stability of the resulting second particulate PASK or PASDK resin can be improved if desired by subjecting the second resin to a caustic treating process. This subsequent washing process is conducted at an elevated temperature with a suitable base such as an alkali metal carbonate or an alkali metal hydroxide.

Another means of further improving the thermal stability of the resulting second particulate PASK or PASDK resin is by treating the resulting second resin at an elevated temperature with water-soluble calcium cations.

The process of subsequently treating the resulting second particulate PASK and/or PASDK resin with either a base or the calcium cations or both can be carried out with conventional equipment. A convenient method for carrying out a subsequent treating procedure is to first recover the second particulate PASK or PASDK resin from the second slurry. The recovered second resin is then contacted with the base and/or the calcium cations in any sequence in an enclosed vessel having provided therein a means of agitation. The contacting can be carried out in single vessel or with a plurality of vessels.

EXAMPLES

Examples provided are intended to assist in a further understanding of this invention. Particular materials employed, species, and conditions are intended to be further illustrative of the invention and are not meant to limit the reasonable scope thereof.

EXAMPLE I

This example demonstrates a process for increasing both the particle size and the bulk density during the recovery process of a particulate PASK resin by the process of this invention. The PASK used in this example is PPSK.

The PPSK used in this example was prepared by reacting, in a stirred 2-gallon reaction vessel, the following reagents which had been previously deoxygenated by three pressurize-release cycles using nitrogen: 502 grams (2.0 moles) of the monomer 4,4'-dichlorobenzophenone (4,4'-DCBP), 192 grams of a 58.3 weight-% sodium hydrosulfide (NaHS) solution (i.e., the equivalent of 112 grams (2.0 moles) of 100% NaHS and 80 grams (4.4 moles) water), 80 grams (2.0 moles) of sodium hydroxide (NaOH), 2400 ml (24.86 moles) of N-methyl-2-pyrrolidone (NMP), and 110 ml (6.1 moles) of water, at 250° C. for approximately 3 hours at a mixer speed of 250 rpm in order to form the first slurry. Note that the total amount of divalent sulfur (i.e., NaHS) initially charged into the reactor was 2.0 moles. Therefore, in addition to the 10.5 moles of water initially charged into the reactor prior to polymerization, the first slurry also has an additional two moles of water which were produced during polymerization.

The particulate PPSK contained in the first slurry was then liquified by increasing the temperature of the first slurry to 300° C. and increasing mixer speed to 500 rpm. The internal pressure of the reactor at 300° C. was 380 psig.

While the internal temperature of the reactor was the polymerization reaction of Resin 5, the temperature of the contents of the reaction vessel was approximately 250° C. The contents of the reaction vessel containing Resin 5 were then cooled until a temperature of about 25° C. was reached. Resin 5 was then recovered from the reaction mixture slurry, washed with distilled water and dried in accordance with the same procedure set out for Resin 1. Data for Resin 5 are recorded in Table I.

TABLE I

Effects of Using a Liquid Separation Agent

| Resin No. | Water[a] (moles) | Separation Agent Type | Charged (moles) | Molar Ratio[b] | Reactor Conditions[c] Temp. (°C.) | Press. (psig) | Reactor Conditions[d] Temp. (°C.) | Press. (psig) | Bulk Density (lbs/ft$^3$) | Type of Particles Produced |
|---|---|---|---|---|---|---|---|---|---|---|
| 1 | 12.5 | WATER | 27.8 | 1.6:1 | 300 | 380 | N/A[e] | 500 | 20 | granular |
| 2 | 12.5 | WATER | 27.8 | 1.6:1 | 300 | 380 | 265 | 530 | 21 | granular |
| 3 | 12.5 | WATER | 27.8 | 1.6:1 | 300 | 380 | 268 | 550 | 20 | granular |
| 4 | 12.5 | WATER | 27.8 | 1.6:1 | 290 | N/A | N/A | 530 | 13 | powder |
| 5 | 12.5 | NONE | — | .5:1 | 250 | 200 | — | — | 9.9 | powder |

[a]Moles of water present in the first slurry at the completion of the polymerization reaction prior to the addition of any additional separation agent are the sum of the moles of water initially charged into the reactor prior to polymerization, and the moles of water produced during polymerization.
[b]Molar ratio of the molar sum of (1) the moles of water present in the first slurry at the completion of the polymerization reaction and (2) the moles of water as the separation agent subsequently added to the liquid mixture, to the moles of polar organic compound present in the first slurry.
[c]Reactor conditions prior to adding water as the separating agent.
[d]Reactor conditions after the addition of the water as the separating agent.
[e]The abbreviation "N/A" indicates that the data were not collected.

being held at 300° C., 500 ml (27.8 moles) of water were slowly added to the reactor. Upon charging the water into the polymerization reactor, the internal pressure of the reactor increased to 500 psig.

The contents of the reactor were then cooled at a rate of approximately 1° C. per minute while being agitated at a mixing speed of approximately 250 rpm. At some point during the cooldown, probably when the internal temperature of the reaction vessel reached approximately 245° C., the substantially liquified resin solidified and formed a second slurry.

The internal temperature of the reaction vessel continued to be cooled until the temperature of the reactor's contents reached approximately 25° C. The particulate resin was then recovered from the second slurry using a No. 200 U.S. Sieve series (74 micron) screen. The recovered resin particles were then washed with distilled water and subsequently dried at 125° C. for approximately 5 hours. Henceforth, this resin will be referred to as Resin 1. Visual and quantitative observations for the Resin 1 are recorded in Table 1.

For the purpose of further demonstrating the effectiveness of the present invention, three additional PPSK resins (i.e., Resins 2, 3, and 4) were prepared. These resins were prepared and recovered in accordance with the same procedure set out for Resin 1 except for the following: (a) for Resin 3, the amount of monomer initially charged to the reaction vessel was 504 grams (2.01 moles) of p-dichlorobenzophenone, and (b) for Resin 4, after the three-hour reaction period, the temperature of the first slurry was not sufficiently raised to liquify all of the PPSK resin contained therein. Specifically, after the polymerization reaction period, the first slurry containing Resin 4 was raised to 290° C., as opposed to 300° C. The data for Resins 2-4 are recorded in Table I.

A control Resin 5 was prepared in accordance with the same procedure set out for Resin 1. The only differences between the preparation of Resin 5 and that of Resin 1 were that for Resin 5, (a) the first slurry was not subsequently heated and (b) there was no addition of a liquid separation agent to the first slurry after polymerization was completed. Specifically, at the completion of The data of Table I demonstrate that the molar ratio of the sum of the moles of water present prior to the addition of any separating agent plus the moles of water charged as the separation agent, to the moles of polar organic compound present in the resin for Resins 1-4 was approximately 1.6:1. The corresponding molar ratio for control Resin 5 was 0.5:1, since no additional water separation agent was subsequently added.

The results recorded in Table I demonstrate that, without the addition of water as the separation agent (i.e., Resin 5), the molar ratio of the moles of water present in the first slurry to the moles of polar organic compound present in the resin was less than that necessary to result in a product having a granular from. This recovery resulted in a resin which is in the form of a powder having a bulk density of less than 10 lbs/ft$^3$. Moreover, while the use of a liquid separation agent, such as water, resulted in the formation of granular particles (i.e., Resin 1-3), if the temperature to which substantially liquify the particulate polymeric resin therein, the type of particles recovered will still be in the form of a powder (see, Resin 4).

Therefore, the data of Table I demonstrate that when a liquid separation agent, such as water, is added in proper proportion to a liquid mixture comprising a substantially liquified PPSK resin and a polar organic compound, the result is a polymer having an increased bulk density and a desirable granular form.

EXAMPLE II

This example demonstrates a process for increasing both the particle size and the bulk density of a particulate PASK resin, wherein, during the inventive process, the internal pressure of the reaction vessel does not exceed 50 psig. The PASK resin used in this example is PPSK.

The PPSK used in this example was prepared by reacting, in a stirred 2-gallon reaction vessel, the following reagents which were previously deoxygenated by three pressurize-release cycles using nitrogen: 502 grams (2.0 moles) of the monomer 4,4'-DCBP, 192 grams of a 58.3 weight-% NaHS solution (i.e., the equivalent of 112 grams (2.0 moles) of 100% NaHS and 80 grams (4.4 moles) water), 84 grams (2.0 moles) of NaOH, 2400 ml (24.86 moles) NMP, and 108 ml (6.0 moles) of water, at 250° C. for approximately 3 hours at a mixer speed of 250 rpm in order to form the first slurry. Note, the total amount of polar organic compound (NMP) charged into the reactor prior to polymerization was 24.86 moles and the total amount of water charged into the same reactor, prior to polymerization, was 188 grams (10.4 moles).

After the three hour reaction period, a first slurry was produced wherein the solid component was predominantly particulate PPSK, although a substantial amount of solid NaCl was produced as a by-product and the liquid component was predominantly a mixture of NMP and water. It should be noted that during polymerization one mole of water is produced for each mole of divalent sulfur (i.e., NaHS) initially charged into the reactor. Therefore, in addition to the 10.4 moles of water charged into the reactor prior to polymerization the first slurry also had an additional two moles of water which were produced during polymerization.

The particulate PPSK, contained in the first slurry, was then liquified by increasing the temperature of the first slurry to 300° C. and increasing the mixer speed to 500 rpm. The internal pressure of the reactor at 300° C. was 350 psig.

After the particulate PPSK was substantially liquified, the temperature of the liquid reaction mixture was lowered to 280° C. At this temperature, the PPSK resin was still in a liquid phase, and the reactor's pressure was 300 psig. While the internal temperature of the reactor was held at 280° C., 450 ml (25 moles) of water were slowly added. Upon charging the water to the liquid reaction mixture, the internal temperature of the reaction vessel dropped to 260° C. while the pressure increased to 410 psig.

The contents of the reaction vessel were then cooled at a rate of approximately 1° C. per minute while being agitated at a speed of approximately 250 rmp. At some time during the cooling process, probably when the internal temperature of the reaction vessel reached approximately 245° C., the liquid-phase resin began to solidify and form a second slurry. The internal temperature of the reaction vessel continued to be cooled until the temperature of the reactor contents reached approximately 25° C. The particulate resin was then recovered from the second slurry using a No. 200 U.S. Sieve Series (74 micro) screen. The recovered resin particles were washed with distilled water and subsequently dried at 125° C. for approximately 5 hours. This resin is referred to as Resin 6. Data for Resin 6 are recorded in Table II.

For the purpose of further demonstrating the effectiveness of the present invention, four additional PPSK resin (i.e., Resins 7–10) were prepared. These resins were prepared and recovered in accordance with the same procedure for Resin 6. The only differences between the preparation of Resins 7–10 and that of Resin 6 were (a) the amount of water as separation agent charged to the liquid mixture and (b) the temperature of the reaction vessel contents when the liquid separation agent was charged to the liquid mixture. These variables, along with data for Resins 7–10, are recorded in Table II.

TABLE II

Effects of Using a Liquid Separation Agent at Temperatures Below Liquification Temperatures

| Resin No. | Water[a] (moles) | Separation Agent Type | Charged (moles) | Molar Ratio[b] | Reactor Conditions[c] Temp. (°C.) | Press. (psig) | Reactor Conditions[d] Temp. (°C.) | Press. (psig) | Bulk Density (lbs/ft$^3$) | Type of Particles Produced |
|---|---|---|---|---|---|---|---|---|---|---|
| 6 | 12.4 | WATER | 25 | 1.5:1 | 280 | 300 | 260 | 410 | 15.0 | granular |
| 7 | 12.4 | WATER | 25 | 1.5:1 | 270 | 270 | 250 | 370 | 15.0 | granular |
| 8 | 12.4 | WATER | 16.7 | 1.2:1 | 280 | 300 | 265 | 375 | 15.2 | granular |
| 9[e] | 12.4 | WATER | 16.7 | 1.2:1 | 270 | 280 | 250 | 350 | 13.0 | powder |
| 10 | 12.4 | WATER | 25 | 1.5:1 | 263 | 240 | 248 | 380 | 7.0 | powder |

[a]See footnote "a" of Table 1.
[b]See footnote "b" of Table 1.
[c]The reaction mixture was first heated to 300° C. and then allowed to cool to the temperature shown. The pressure shown is that of the cooled condition.
[d]See footnote "d" of Table 1.
[e]It is believed that technical errors affected the data for this resin.

The data from Table II demonstrate that the molar ratio of the sum of the moles of water present prior to the addition of any water as separation agent plus the moles of water charged as the separation agent, to the moles of polar organic compound present in the first slurry, for Resins 6, 7 and 10 is approximately 1.5:1. The corresponding molar ratio for Resins 8 and 9 is approximately 1.2:1.

The results recorded in Table II demonstrate that if a sufficient amount of the separation agent (i.e., water) is added to a liquid mixture comprising a substantially liquified PPSK resin, while the liquid mixture is at a temperature of at least 20° C. above the liquid-to-solid phase transitional temperature, the result is a polymer having an increased bulk density and a granular form (see Resins 6–8).

If, however, the same amount of the same separation agent is added to a liquid mixture comprising a substantially liquified PPSK resin while the liquid reaction mixture is at a temperature too close to the liquid-to-solid phase transitional temperature, the addition of the liquid separation agent decreases the temperature of the reaction mixture to a point below the liquid-to-solid phase transitional temperature of the PPSK resin and a powder forms, (compare data for Resins 7 and 10). It should be noted that technical errors (the too rapid addition of water) are believed to have adversely affected the data for Resin 9.

Therefore, the data of Table II demonstrate that when a sufficient amount of water is employed as a separation agent with a liquid mixture comprising a substantially liquified PPSK resin and a polar organic compound (i.e., NMP) and, after the temperature of the liquid mixture has been lowered (e.g., from 300° to a temperature greater than or equal to 270° C.) the internal pressure of the reaction vessel during the polymer recovery process was maintained below 500 psig. The data further demonstrate that the resulting PPSK resin had an increased bulk density and a granular form.

EXAMPLE III

This example demonstrates a process for preparing a second particulate PASK resin from a first particulate PASK resin, by the process of this invention using tetraethylene glycol dimethyl ether as the liquid separation agent. The specific first particulate PASK resin used in this Example is PPSK.

The PPSK used in this example was prepared by reacting, in a stirred 2-gallon reaction vessel, the following reagents which were previously deoxygenated by 3 pressurize-release cycles using nitrogen: 502 grams (2.0 moles) of the monomer 4,4'-DCBP, 192 grams of a 58.3 weight-% NaHS solution (i.e., the equivalent of 112 grams (2.0 moles) of 100% NaHS and 80 grams (4.4 moles) water), 80 grams (2.0 moles) of NaOH, 2400 ml (24.86 moles) of NMP, and 110 ml (6.1 moles) of water, at 250° C. for approximately 3 hours at a mixer speed of 250 rpm.

After the three hour reaction period, a heated first slurry was produced wherein the solid component was predominantly particulate PPSK and by-product sodium chloride and the liquid component was predominantly a mixture of NMP and water. During polymerization, one mole of water was produced for each mole of divalent sulfur (i.e., NaHS) initially charged into the reactor. Therefore, in addition to the 190 ml (10.5 moles) of water initially charged into the reactor prior to polymerization, the heated first slurry also had an additional 2 moles of water which were produced during polymerization. The temperature of the heated first slurry at this point in time was 250° C. and the internal pressure within the reaction vessel was 180 psig.

The particulate PPSK contained in the heated first slurry was then liquified by increasing the temperature of the first slurry to 300° C. and increasing mixer speed to 500 rpm. The internal pressure of the reactor at 300° C. was 380 psig.

While the internal temperature of the reactor was being held at 300° C., 500 ml (2.3 moles) of tetraethylene glycol dimethylether (henceforth, tetraglyme) were slowly charged into the reactor, as the liquid separation agent. Upon charging the tetraglyme into the polymerization reactor, the internal pressure of the reactor increased to 390 psig.

The contents of the reactor were then cooled at a rate of approximately 1° C. per minute while being agitated at a mixing speed of approximately 250 rpm. At some point during the cooling process, probably when the internal temperature of the reaction vessel reached approximately 245° C., the substantially liquified resin began to solidify and form a second slurry.

The internal temperature of the reaction vessel continued to be cooled until the temperature of the reactor's contents reached approximately 25° C., producing a second slurry. The particulate resin was then recovered from the second slurry using a No. 200 U.S. Sieve series (74 micron) screen. The recovered resin particles were then washed with distilled water and subsequently dried at 125° C. for approximately 5 hours. Henceforth, this resin will be referred to as Resin 11. Visual and quantitative observations for Resin 11 are recorded in Table III.

For the purpose of further demonstrating the effectiveness of the present invention, a comparison PPSK resin (Resin 12) was prepared. Resin 12 was prepared and recovered in a accordance with the same procedure set out for Resin 11 except that 500 ml (27.8 moles) of water were used as the liquid separation agent. Data for Resin 12 are recorded in Table III.

A control polymer resin (Resin 13) was also prepared in accordance with the same procedure set out for Resin 11. The only differences between the preparation of Resin 13 and that of Resin 11 were that for Resin 13, (a) the first slurry was not subsequently heated and (b) there was no addition of a liquid separation agent to the first slurry after polymerization was completed. Specifically, at the completion of the polymerization reaction of Resin 13, the temperature of the reactor contents was approximately 250° C. The reactor contents containing Resin 13 were then cooled until a temperature of about 25° C. was reached. Resin 13 was then recovered from the reaction mixture slurry, washed with distilled water and dried in accordance with the same procedure set out for Resin 11. Data for Resin 13 are recorded in Table III.

TABLE III

Effects of Using Various Liquid Separation Agents

| Resin No. | Water[a] (moles) | Separation Agent Type | Charged (moles) | Reactor Conditions[b] Temp. (°C.) | Press. (psig) | Reactor Conditions[c] Temp. (°C.) | Press. (psig) | Bulk Density (lbs/ft$^3$) | Type of Particles Produced |
|---|---|---|---|---|---|---|---|---|---|
| 11 | 12.6 | TETRAGLYME | 2.3 | 300 | 380 | N/A[d] | 390 | 14 | granular |
| 12 | 12.6 | WATER | 27.8 | 300 | 380 | 265 | 530 | 21 | granular |
| 13 | 12.6 | NONE | — | 250 | 200 | — | — | 9.9 | powder |

[a]Moles of water present in the first slurry at the completion of the polymerization reaction prior to the addition of any additional water (used as a liquid separation agent for example) are the sum of the moles of water initially charged into the reactor prior to polymerizaton, and the moles of water produced during polymerization.
[b]Reactor conditions prior to adding any separating agent.
[c]Reactor conditions after the addition of the liquid separating agent.
[d]The abbreviation "N/A" indicates that the data were not collected.

The data of Table III again demonstrate that when a sufficient amount of a liquid separation agent is present in a liquid mixture comprising a substantially liquified PPSK resin and a polar organic compound, the result is a polymer having an increased bulk density and a desirable granular configuration.

Note that when tetraglyme is added as a separation agent, a granular polymer with increased bulk density is provided at lower operating pressures than when (water) is used alone as the separation agent (Resin 11 vs. Resin 12).

It is evident from the foregoing that various modifications can be made to the embodiments of this invention without departing from the spirit and scope thereof, which will be apparent to those skilled in the art.

That which is claimed is:

1. A process for treating a first solid particulate resin selected from the group consisting a poly(arylene sulfide ketone)s and poly(arylene sulfide diketone)s in a first slurry, wherein said first resin is dispersed in a liquid component comprising a polar organic compound, said process comprising:

(a) liquifying said first solid particulate resin to form a first mixture comprising said liquified resin and said polar organic compound;
(b) adding, to said first mixture, an amount of at least one separation agent effective to produce a second mixture;
(c) reducing the temperature of said second mixture sufficiently to solidify said liquified resin and form a second slurry comprising a second particulate resin dispersed in said polar organic compound, wherein said second resin has a bulk density greater than that of said first solid particulate resin.

2. A process in accordance with claim 1 wherein said first particulate resin comprises a poly(arylene sulfide ketone).

3. A process in accordance with claim 2 wherein said liquification step (a) comprises heating said first slurry to a temperature of at least 300° C.

4. A process in accordance with claim 3 wherein said step (a) liquification comprises heating said first slurry to a temperature in the range of from about 300° C. to about 325° C.

5. A process in accordance with claim 2 wherein said first slurry of said poly(arylene sulfide ketone) is prepared by reacting a dihaloaromatic ketone, an alkali metal sulfide, water, and a polar organic compound under polymerization conditions.

6. A process is accordance with claim 5 wherein said dihaloaromatic ketone is a dihalobenzophenone, said alkali metal sulfide is sodium sulfide and said polar organic compound is selected from the group consisting of N-methyl-2-pyrrolidone and N-cyclohexyl-2-pyrrolidone.

7. A process in accordance with claim 6 wherein said dihaloaromatic ketone is 4,4'-dichlorobenzophenone.

8. A process in accordance with claim 2 wherein said poly(arylene sulfide ketone) is poly(phenylene sulfide ketone).

9. A process in accordance with claim 1 wherein said first solid particulate resin comprises a poly(arylene sulfide diketone).

10. A process in accordance with claim 9 wherein said first slurry of said poly(arylene sulfide diketone) is prepared by reacting a dihaloaromatic diketone, an alkali metal sulfide, water and a polar organic compound under polymerization conditions.

11. A process in accordance with claim 10 wherein said dihaloaromatic ketone is a bis-chlorobenzoyl benzene, said alkali metal sulfide is sodium sulfide and said polar organic compound is selected from the group consisting of N-methyl-2-pyrrolidone and N-cyclohexyl-2-pyrrolidone.

12. A process in accordance with claim 9 wherein said poly(arylene sulfide diketone) is poly(phenylene sulfide diketone).

13. A process in accordance with claim 1 wherein said liquid component of said first slurry further comprises water.

14. A process in accordance with claim 1 wherein said amount of separation agent added is that amount necessary to effect or enhance a separation between said polar organic compound and a poly(arylene sulfide ketone) or poly(arylene sulfide diketone) polymer rich phase.

15. A process in accordance with claim 14 wherein said amount of separation agent added is that amount necessary to result in said second resin having a bulk density greater than that of said first solid resin.

16. A process in accordance with claim 1 wherein said liquid separation agent is selected from the group consisting of paraffinic hydrocarbons, higher boiling alcohols, higher boiling ethers, and water.

17. A process in accordance with claim 16 wherein said liquid separation agent is water.

18. A process in accordance with claim 1 further comprising a temperature reduction prior to step (b), which comprises:
reducing the temperature of said first liquid mixture to a temperature not less than the liquid-to-solid phase transitional temperature of said first solid particulate resin.

19. A process in accordance with claim 18 wherein said amount of separation agent added is that amount necessary to effect or enhance a separation between said polar organic compound and a poly(arylene sulfide ketone) or poly(arylene sulfide diketone) polymer rich phase.

20. A process in accordance with claim 18 wherein said amount of separation agent added is that amount necessary to result in said second resin having a bulk density greater than that of said first solid resin.

21. A process in accordance with claim 1 wherein said separation agent is tetraethyleneglycol dimethylether.

22. A particulate resin, having associated therewith improved handling, prepared by a process comprising the steps of:
(a) preparing in an enclosed vessel a first slurry, wherein the solid component of said first slurry comprises a first particulate polymeric resin selected from the group consisting of poly(arylene sulfide ketone)s and poly(arylene sulfide diketone)s, and wherein the liquid component of said first slurry comprises a polar organic compound;
(b) liquifying said particulate resin to form a first mixture comprising said liquified resin and said polar organic compound;
(c) adding to said first mixture an amount of at least one separation agent effective to produce a second mixture;
(d) reducing the temperature of said second mixture sufficiently to solidify said liquified resin and form a second slurry, wherein the solid component of said second slurry comprises a second particulate resin having a bulk density which is greater than the bulk density of said first particulate resin and is greater than about 10 lbs/ft$^3$, wherein the processability of said second particulate resin is superior to that of said first particulate resin.

23. A polymeric resin as in claim 22 wherein said first particulate resin comprises poly(arylene sulfide ketone).

24. A polymeric resin as in claim 22 wherein said first particulate resin comprises poly(arylene sulfide diketone).

25. A polymeric resin as in claim 22 wherein said liquid component of said first slurry further comprises water.

26. A polymer resin as in claim 22 wherein said separation agent is tetraethylene glycol dimethylether.

* * * * *

UNITED STATES PATENT AND TRADEMARK OFFICE
CERTIFICATE OF CORRECTION

PATENT NO. : 5,089,597
DATED : February 18, 1992
INVENTOR(S) : Afif M. Nesheiwat and Jon F. Geibel It is certified that error appears in the above-identified patent and that said Letters Patent is hereby corrected as shown below:

On title page, item [75] Inventors: delete

"John E. Geibel", and insert --- Jon F. Geibel ---

Signed and Sealed this

Fifth Day of October, 1993

*Attest:*

BRUCE LEHMAN

*Attesting Officer*     *Commissioner of Patents and Trademarks*